(12) United States Patent
Emek et al.

(10) Patent No.: US 7,085,748 B2
(45) Date of Patent: Aug. 1, 2006

(54) HYPER-ARC CONSISTENCY IN A CONTRAINT SATISFACTION NETWORK

(75) Inventors: Roy Emek, Kfar Shmaryahu (IL); Alan Hartman, Haifa (IL); Gil Shurek, Haifa (IL); Michael Veksler, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 09/788,152

(22) Filed: Feb. 16, 2001

(65) Prior Publication Data

US 2002/0169587 A1 Nov. 14, 2002

(51) Int. Cl.
G06F 15/18 (2006.01)

(52) U.S. Cl. .............................. 706/14; 706/12; 706/46
(58) Field of Classification Search .................. 706/14, 706/12, 46
See application file for complete search history.

(56) References Cited

U.S. PATENT DOCUMENTS 5,617,510 A * 4/1997 Keyrouz et al. ............... 706/45
5,636,328 A * 6/1997 Kautz et al. ................... 706/45
6,031,984 A * 2/2000 Walser ........................... 703/2
6,063,126 A * 5/2000 Borduin ......................... 703/2

OTHER PUBLICATIONS

Alan K. Mackworth, Consistency in Networks of Relations, 1977, North Holland Publishing Company, Artificial Intelligence, 99-118.*

Sabin, D. et al., "Understanding and Improving the MAC Algorithm", Constraint Programming Annual Conference, 1997, pp. 167-181, USA.

Bessiere, C. et al., "Using Constraint Metaknowledge to Reduce Arc Consistency Computation", *Artif. Intell.* 107(1), pp. 125-148, 1999.

Dechter, R. et al., "Local and Global Relational Consistency", *Artif. Intell.* 41, pp. 273-312, 1990.

Bessiere, C. et al., "Arc Consistency for General Constraint Networks: Preliminary Results", Proceedings IJCAI, 1997, Negoya, Japan, pp. 398-404.

Bessiere, C. et al., "MAC and Combined Heuristics: Two Reasons to Forsake FC (and CBJ?) on Hard Problems", Constraint Programming Annual Conference, 1996, pp. 61-75, Cambridge.

Offutt, A.J., "An Integrated Automatic Test Data Generation System", *Journal of Systems Integration*, vol. 1, No. 3, Nov. 1991, pp. 391-409, Kluwer Academic Publishers.

(Continued)

*Primary Examiner*—Joseph P. Hirl
(74) *Attorney, Agent, or Firm*—Darby & Darby

(57) ABSTRACT

A method for solving a constraint satisfaction problem includes receiving a set of variables having respective input domains and a set of relations among the variables, and building a network of one or more hyper-arcs representative of the set of relations, each hyper-arc corresponding to one of the relations and linking nodes in the network corresponding to the variables that are subject to the relation. For each of the hyper-arcs, the variables are assembled in a hierarchy based on the relation corresponding to the hyper-arc. The input domains of the variables in the hierarchy are reduced, so as to determine respective output domains of the variables that are consistent with the relations.

41 Claims, 6 Drawing Sheets

OTHER PUBLICATIONS

Van Beek, P. et al., "On the Minimality and Global Consistency of Row-Convex Constraint Networks", *Journal of ACM*, vol. 42, pp. 543-561, 1995.

Marriott, K. et al., *Programming with Constraints: An Introduction*, Ch. 3.4, "Bounds Consistency", the MIT Press, pp. 97-109, 1999.

Mackworth, A., "On Reading Sketch Maps", IJCAI 1977, pp. 598-606.

Mackworth, A., "Consistency in Networks of Relations", *Artificial Intelligence*, vol. 8, 1977, pp. 99-118.

Freuder, E., "A Sufficient Condition for Backtrack-Free Search", *Journal of the Association for Computing Machinery*, vol. 29, No. 1, Jan. 1982, pp. 24-32.

Lewin, D., et al., "Constraint Satisfaction for Test Program Generation", *Proc. of the IEEE 14$^{th}$ Int'l Press Conference on Computers and Communic.*, 1995, pp. 45-48.

Turton, B., "Extending Quine-McCluskey for Exclusive-Or Logic Synthesis", *IEEE Transactions on Education*, vol. 39, No. 1, Feb. 1996, pp. 81-85.

* cited by examiner

HYPER-ARC CONSISTENCY IN A CONSTRAINT SATISFACTION NETWORK

FIELD OF THE INVENTION

The present invention relates generally to solving constraint satisfaction problems, and specifically to methods and systems for solving such problems by maintaining arc consistency.

BACKGROUND OF THE INVENTION

Many of the tasks that are addressed by decision-making systems and artificial intelligence can be framed as constraint satisfaction problems. In this framework, the task is specified in terms of a set of variables, each of which can assume values in a given domain, and a set of predicates, or constraints, that the variables must simultaneously satisfy. The set of variables and constraints is referred to as a constraint network. Each constraint may be expressed as a relation, defined over some subset of the variables, denoting valid combinations of their values. A solution to the problem is an assignment of a value to each variable from its domain that satisfies all of the constraints.

Constraint satisfaction methods have been found useful in a variety of applications, including:
Artificial intelligence
Robotic control
Temporal reasoning
Natural language parsing
Spatial reasoning
Test generation for software and hardware systems
Machine vision
Medical diagnosis
Resource allocation
Crew scheduling
Time tabling
Frequency allocation
Graph coloring.

For example, Lewin et al. describe a constraint satisfaction method for use in automated testing of memory access, in a paper entitled "Constraint Satisfaction for Test Program Generation," in the proceedings of the IEEE 14th International Phoenix Conference on Computers and Communications (1995), pages 45–48, which is incorporated herein by reference. The authors use a constraint satisfaction algorithm to generate addresses and memory access instructions that provide effective verification of the design of a computer processor.

The constraint network can be viewed as a hypergraph, having a node for each variable and a hyper-edge for each constraint. These hyper-edges are referred to as arcs, wherein the members of such an arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc. If every arc in the hypergraph is consistent, then the network is said to be arc-consistent.

In large networks, an exhaustive search for valid assignment of the variables can be extremely time-consuming. Various methods have been used to improve the efficiency of the search, such as pruning the search tree before or during the search, decision algorithms for choosing the next variable to instantiate or the next value to choose for the variable, and backtrack algorithms for deciding where to resume the search after reaching a "dead end."

Recent research suggests that the most efficient general solutions for constraint satisfaction problems are algorithms based on maintaining arc consistency. These algorithms were introduced by Mackworth in an article entitled "Consistency in Networks of Relations," published in *Artificial Intelligence* 8, pages 99–118 (1977), which is incorporated herein by reference. Arc consistency algorithms are based on the observation that given variables $V_1$ and $V_2$, with discrete domains $D_1$ and $D_2$, if $x \in D_1$, and there is no $y \in D_2$ that satisfies a given constraint $P_{ij}$, imposed on $V_1$ and $V_2$, then x can be deleted from $D_1$. This basic action of arc consistency algorithms is embodied in the Boolean procedure "REVISE":

```
procedure REVISE((i,j)):
begin
    DELETE ← false
    for each x ∈ D_i do
        if there is no y ∈ D_j such that P_ij(x,y)
        then
            begin
                delete x from D_i;
                DELETE ← true
            end
    return DELETE
end
```

It is also necessary, of course, that the variables have single node consistency, i.e., that they satisfy any applicable unary predicates in the constraint network. Mackworth also defines a simple procedure NC(i) for testing single node consistency.

Whenever REVISE is successful (i.e., when it results in reducing the domain of one of the nodes of the arc), it is necessary to determine whether the other arcs of the graph (G) are still consistent, and to REVISE their node domains as required to maintain consistency. Mackworth points out that it is not necessary to apply REVISE to all of the arcs in the graph, but only to those arcs for which the result of applying REVISE could possibly be changed from false to true. Thus, the arcs are maintained in a queue (Q), and the following algorithm is used to reapply REVISE to any of the arcs in the queue for which it is appropriate:

```
begin
    for i ← 1 until n do NC(i);
    Q ← { (i,j) | (i,j) ∈ arcs(G), i ≠ j }
    while Q not empty do
        begin
            select and delete any arc (k,m) from Q;
            if REVISE ((k,m)) then Q ← Q ∪
                { (i, k) | (i, k) ∈ arcs (G), i ≠ k, i ≠ m}
        end
end
```

Arc consistency algorithms may also be generalized to non-binary constraints, as described by Mackworth, for example, in an article entitled "On Reading Sketch Maps," in *Proceedings of the International Joint Conference on Artificial Intelligence* (1977), pages 598–606. Other algorithms for maintaining arc consistency are also known in the art. A recent survey of these algorithms is presented by Bessiere et al., in "Using Constraint Metaknowledge to Reduce Arc Consistency Computation," published in *Artificial Intelligence* 107(1), pages 125–148 (1999). Both of these articles are incorporated herein by reference.

Methods known in the art for solving constraint networks by maintaining arc consistency require that a constraint be given as a logical relation, represented as an explicit set of valid combination of variable values, or revealed through a predicate. Consequently, solutions of this type have been limited to problems and constraints for which this representation is feasible and provides for practical manipulation. Known methods suggest general schemes for consistency maintenance. A concrete consistency maintenance procedure should be reconstructed, following the given scheme, per constraint, or in some cases per constraint network. It is thus desirable to have a language for specifying constraints, and to be able to provide an automatic procedure for constructing consistency maintenance procedures for constraints specified using this language. A rudimentary grammar for constraint expressions is described by Offutt, in "An Integrated Automatic Test Data Generation System," published in *Journal of Systems Integration* 1(3), pages 391–409 (1991), which is incorporated herein by reference. This scheme, however, deals only with unary constraints and is not suitable for maintaining arc consistency.

A number of constraint satisfaction systems are described in the patent literature. For example, U.S. Pat. No. 5,636,328, whose disclosure is incorporated herein by reference, describes methods and apparatus for finding values that satisfy a set of constraints, applied particularly to control of a robotic arm. The technique described in this patent is used in local search procedures for finding such constraint-satisfying values, with the aim of overcoming the tendency of such local search procedures to "get stuck" at certain points in the search. The technique dynamically adds weight to constraints in the set which are not satisfied by the current set of values and uses the weights of the constraints to determine the next set of values to be used in the local search. It is thus, essentially, a statistical method for solving constraint satisfaction problems, rather than an analytical method for maintaining arc consistency.

As another example, U.S. Pat. No. 5,617,510, whose disclosure is also incorporated herein by reference, describes a method, useful in computer-aided design, of identifying possible solutions to an over-constrained system having a collection of entities and constraints.

SUMMARY OF THE INVENTION

Preferred embodiments of the present invention provide a general procedure for computing arc consistency on a single hyper-edge of a constraint network. The procedure is applicable not only to binary (two-variable) constraints, but also to constraints involving three or more variables. Embodiments of the present invention provide a method to construct an automatic procedure for computing arc consistency for declaratively-described constraints. The automatic procedure supports every constraint expression derived from a given context-free grammar. The declarative representation selected for constraints is implicit, i.e., it does not require explicit enumeration of the tuples allowed by the constraint.

The constraint representation method and the computation procedure make it feasible to handle large and complex constraint relations defined over very large variable domains. They are applicable to constraints that are constructed from substantially any combination of operators, preferably including logical, arithmetic and bitwise operators, and including both linear and non-linear constraints.

Thus, the present invention broadens the applicability of constraint network solutions based on maintaining arc consistency to types of problems that were previously intractable. The inventors have found the present invention to be particularly useful in automatic test generation for hardware and software systems, but it can similarly be applied to other types of constraint satisfaction problems, as are known in the art.

In preferred embodiments of the present invention, a generic relational language is defined, enabling a user to express constraints in a constraint satisfaction problem by declarative description, rather than as explicitly enumerated logical relations or as ad hoc consistency computation procedures. The grammar of the language allows arbitrary combinations of arithmetic, logical and bitwise operators, to be used in describing the constraints. Based on this language, each complex constraint, or arc, in the overall constraint network is transformed into a sub-network of hyper-edges, labeled with the operators of the language, with nodes representing the domains of the variables on the arc. The domains are reduced successively until global consistency is achieved over all the hyper-edges of the sub-network. Global consistency on the sub-network assures that arc consistency is maintained on the arc corresponding to the original complex constraint.

In order to achieve this global hyper-arc consistency, each sub-network is preferably decomposed into a set of trees, having operators and variables as nodes. Each tree is traversed in an orderly way, and the domains of the variables on the tree are reduced, until consistency is reached on all the branches of the tree. Traversal of the trees is based on a process of projecting the domains of the input variables of each operator onto the output variables, and vice versa, until the precise domains of all of the variables are determined. Once arc consistency is achieved for a tree, the tree becomes globally consistent, as well. The domains of the variables on all of the trees in the set are then combined to generate a maximal globally-consistent reduction of the domain of the original network. This decomposition procedure is most conveniently applied in constraint networks that are defined using the above-mentioned relational language, but it may also be used in arc consistency computations based on other grammars, or which are based on relations and operators of other types.

There is therefore provided, in accordance with a preferred embodiment of the present invention, a meth,d for solving a constraint satisfaction problem, including:

receiving a set of variables having respective input domains and a set of relations among the variables;

building a network of one or more hyper-arcs representative of the set of relations, each hyper-arc corresponding to one of the relations and linking nodes in the network corresponding to the variables that are subject to the relation;

for each of the hyper-arcs, assembling the variables in a hierarchy based on the relation corresponding to the hyper-arc; and reducing the input domains of the variables in the hierarchy, so as to determine respective output domains of the variables that are consistent with the relations.

Preferably, assembling the variables includes arranging the variables in a hierarchical graph, having vertices corresponding to the variables and having the form of one or more trees. Further preferably, reducing the input domains includes reducing the input domains over each of the trees so as to find respective interim domains of the variables that are consistent with the relation over each of the trees, and combining the interim domains over all of the trees to determine the output domains.

Additionally or alternatively, receiving the set of relations includes receiving a definition of the relations as a combination of operators, selected from a group of arithmetic, bitwise and logical operators, which are applied to the variables, and arranging the variables in the graph includes inserting vertices in the graph corresponding to the operators, connecting the vertices corresponding to the variables. Preferably, reducing the input domains includes finding projections of the operators onto the domains of the variables in the graph. Most preferably, receiving the set of variables includes receiving an output variable and at least one input variable for each of the operators, and finding the projections includes projecting the domain of the at least one input variable of each of the operators onto the domain of the output variable thereof, and projecting the domain of the output variable of each of the operators onto the domain of the at least one input variable thereof.

In a preferred embodiment, building the network of the hyper-arcs includes representing the set of relations as a disjunction of multiple relations, with one of the hyper-arcs corresponding respectively to each of the relations, wherein determining the respective output domains includes determining interim domains of the variables for each of the hyper-arcs, and taking a union of the interim domains for each of the variables to determine the output domains.

Preferably, reducing the input domains includes determining the output domains such that for any given value in the respective output domain of each of the variables, there exist values of the other variables in the respective output domains thereof that, together with the given value, constitute a solution to the set of relations. Additionally or alternatively, reducing the input domains includes determining the output domains such that every set of values of the variables in the input domains that constitutes a solution to the set of relations is contained in the output domains of the variables.

In a preferred embodiment, receiving the set of relations includes receiving a relation relating to at least three of the variables.

In a further preferred embodiment, receiving the set of variables includes receiving variables that are characteristic of inputs to a system under test, and reducing the input domains includes determining values of the inputs to be made to the system based on the output domains of the variables. Typically, the system includes an electronic processor, and determining the values of the inputs includes determining commands and addresses to be input to the processor.

In another preferred embodiment, receiving the set of variables Includes receiving control parameters of a mechanical system, and reducing the input domains includes generating a command to control the system based on the output domains of the parameters.

In still another preferred embodiment, receiving the set of variables includes receiving features of an image containing visual information, and reducing the input domains includes identifying an object in the image based on the features.

In yet another preferred embodiment, receiving the set of variables includes receiving a natural language input, and reducing the input includes parsing the natural language, responsive to the output domains, so as to interpret the language.

In a further preferred embodiment, receiving the set of variables includes receiving characteristics of a condition, and reducing the input domains includes determining a diagnosis of the condition based on the output domains.

In an additional preferred embodiment, receiving the set of variables includes receiving characteristics of resources whose use is to be scheduled, and reducing the input domains includes scheduling the use of the resources subject to the set of relations.

There is also provided, in accordance with a preferred embodiment of the present invention, a method for solving a constraint satisfaction problem, including:

receiving a set of variables having respective input domains and a set of constraints including a relation among at least three of the variables;

building a network of one or more hyper-arcs representing the constraints, the hyper-arcs including nodes representing the variables, one of the hyper-arcs corresponding to the relation among the at least three variables; and reducing the input domains of the variables in the network of hyper-arcs, so as to determine respective output domains of the variables that are consistent with the set of constraints.

There is additionally provided, in accordance with a preferred embodiment of the present invention, a method for solving a constraint satisfaction problem, including:

receiving a set of variables having respective input domains and a set of constraints including one or more relations defined as a combination of operators, selected from a group of arithmetic, bitwise and logical operators, which are applied to the variables;

building a network of one or more hyper-arcs representing the set of constraints, each hyper-arc corresponding to one of the relations expressed in terms of the operators and linking nodes in the network corresponding to the variables to which the operators are applied; and reducing the input domains of the variables in the network responsive to the operators, so as to determine respective output domains of the variables that are consistent with the set of constraints.

Preferably, receiving the set of constraints includes providing a language for specifying the constraints, the language having grammatical rules, and specifying the constraints using the language.

Preferably, the operators include multi-variable operators, which receive two of more of the variables as their inputs. Further preferably, the multi-variable operators include one or more operators selected from a group consisting of addition, subtraction, multiplication, division and modulo operators. Additionally or alternatively, the multi-variable operators include one or more operators selected from a group consisting of an operator testing equality of two of the variables, an operator testing inequality of two of the variables, and an operator testing whether one of the variables is greater than another of the variables. Further additionally or alternatively, the multi-variable operators include one or more operators selected from a group consisting of a bitwise "and," bitwise "or" and bitwise "exclusive or" operations.

There is further provided, in accordance with a preferred embodiment of the present invention, apparatus for solving a constraint satisfaction problem, including a constraint processor, arranged to receiving a set of variables having respective input domains and a set of constraints including one or more relations among the variables, to build a network of one or more hyper-arcs representative of the set of constraints, each hyper-arc corresponding to one of the relations and linking nodes in the network corresponding to the variables that are subject to the relation and for each of the hyper-arcs, to assemble the variables in a hierarchy based on the relation corresponding to the hyper-arc, and to reduce the input domains of the variables in the hierarchy, so as to determine respective output domains of the variables that are consistent with the set of constraints.

There is moreover provided, in accordance with a preferred embodiment of the present invention, apparatus for solving a constraint satisfaction problem, including a constraint processor, arranged to receive a set of variables having respective input domains and a set of constraints including a relation among at least three of the variables, to build a network of one or more hyper-arcs representative of the set of constraints, including a hyper-arc corresponding to the relation among the at least three variables and linking nodes in the network corresponding to the variables that are subject to the relation, and to reduce the input domains of the variables in the network of hyper-arcs, so as to determine respective output domains of the variables that are consistent with the set of constraints.

There is furthermore provided, in accordance with a preferred embodiment of the present invention, apparatus for solving a constraint satisfaction problem, including a constraint processor, arranged to receive a set of variables having respective input domains and a set of constraints including one or more relations defined as a combination of operators, selected from a group of arithmetic, bitwise and logical operators, which are applied to the variables, to build a network of one or more hyper-arcs representative of the set of constraints, each hyper-arc corresponding to one of the relations expressed in terms of the operators and linking nodes in the network corresponding to the variables to which the operators are applied, and to reduce the input domains of the variables in the network responsive to the operators, so as to determine respective output domains of the variables that are consistent with the set of constraints.

There is also provided, in accordance with a preferred embodiment of the present invention, a computer software product for solving a constraint satisfaction problem, the product including a computer-readable medium in which program instructions are stored, which instructions, when read by a computer, cause the computer, upon receiving a set of variables having respective input domains and a set of constraints including one or more relations among the variables, to build a network of one or more hyper-arcs representative of the constraint, each hyper-arc corresponding to one of the relations and linking nodes in the network corresponding to the variables that are subject to the relation and, for each of the hyper-arcs, to assemble the variables in a hierarchy based on the relation corresponding to the hyper-arc, and to reduce the input domains of the variables in the hierarchy, so as to determine respective output domains of the variables that are consistent with the set of constraints.

There is additionally provided, in accordance with a preferred embodiment of the present invention, a computer software product for solving a constraint satisfaction problem, the product including a computer-readable medium in which program instructions are stored, which instructions, when read by a computer, cause the computer, upon receiving a set of variables having respective input domains and a set of constraints including a relation among at least three of the variables, to build a network of one or more hyper-arcs representative of the set of constraints, including a hyper-arc corresponding to the relation among the at least three variables and linking nodes in the network corresponding to the variables that are subject to the relation, and to reduce the input domains of the variables in the network of hyper-arcs, so as to determine respective output domains of the variables that are consistent with the set of constraints.

There is further provided, in accordance with a preferred embodiment of the present invention, a computer software product for solving a constraint satisfaction problem, the product including a computer-readable medium in which program instructions are stored, which instructions, when read by a computer, cause the computer, upon receiving a set of variables having respective input domains and a set of constraints including one or more relations defined as a combination of operators, selected from a group of arithmetic, bitwise and logical operators, which are applied to the variables, to build a network of one or more hyper-arcs representative of the set of constraints, each hyper-arc corresponding to one of the relations expressed in terms of the operators and linking nodes in the network corresponding to the variables to which the operators are applied, and to reduce the input domains of the variables in the network responsive to the operators, so as to determine respective output domains of the variables that are consistent with the set of constraints.

The present invention will be more fully understood from the following detailed description of the preferred embodiments thereof, taken together with the drawings in which:

DETAILED DESCRIPTION OF PREFERRED EMBODIMENTS

Figure 1:
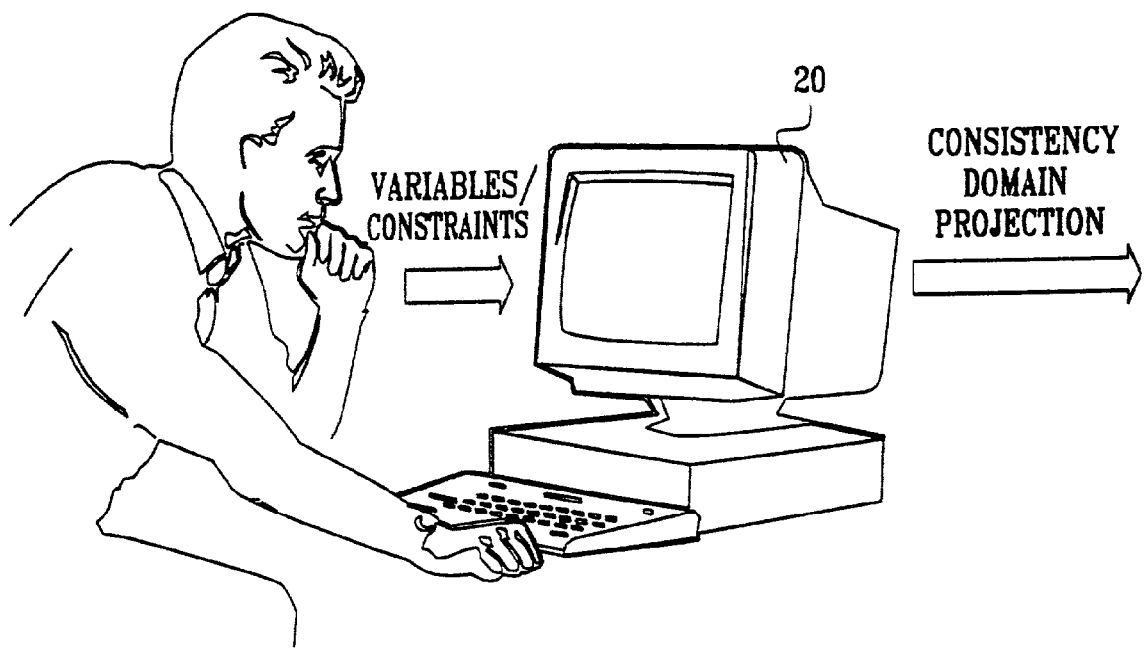
FIG. 1 is a schematic, pictorial illustration of a system for solving constraint satisfaction problems, in accordance with a preferred embodiment of the present invention.

FIG. 1 is a schematic pictorial illustration of a system 20 for solving constraint satisfaction problems, in accordance with a preferred embodiment of the present invention. The system receives a definition of a set of variables and a network of constraints to be applied to those variables, preferably in the form of input from a user of the system in a special operator grammar, as described below. The system then finds solutions to the constraint network, in the form of values of the variables that satisfy all of the constraints. For this purpose, the system uses methods of projecting the operators onto the domains of the variables while maintaining arc consistency. For each n-ary constraint, system 20 reduces the domains of the variables so that they hold only those values that may be part of some solution, as described in detail hereinbelow.

In a preferred embodiment of the present invention, by way of example, the variables comprise possible inputs to a hardware device or software program under development. These inputs are typically instructions and addresses that would be input to the device or program in normal operation. System 20 uses the constraints provided by the operator, and/or constraints that it computes automatically itself, to determine combinations of the instructions and addresses to use as test inputs to the device. These inputs may then be applied to the device or program itself, or they may be input as test cases to a simulator for pre-production verification of the design of the device or program.

Typically, system 20 comprises a general-purpose or dedicated computer, programmed with suitable software for carrying out the functions described herein. The software may be supplied to the computer in electronic form, over a network or communication link, for example, or it may be provided on tangible media, such as CD-ROM or DVD.

System 20 can be configured to solve a wide range of other types of constraint satisfaction problems, and is not limited to the test generation application described above. The system may be used, either in the configuration of a stand-alone computer or integrated with other input and output devices, to carry out substantially any function that can be associated with a constraint networks. Examples of such functions are listed in the Background of the Invention, and include controlling a robot based on sensor inputs; analyzing visual or spatial information to identify and characterize objects in an image; parsing natural language input to interpret its meaning; suggesting medical diagnoses based on symptoms and test results; and determining resource allocations and scheduling. Other applications of system 20 will be apparent to those skilled in the art.

Figure 2:
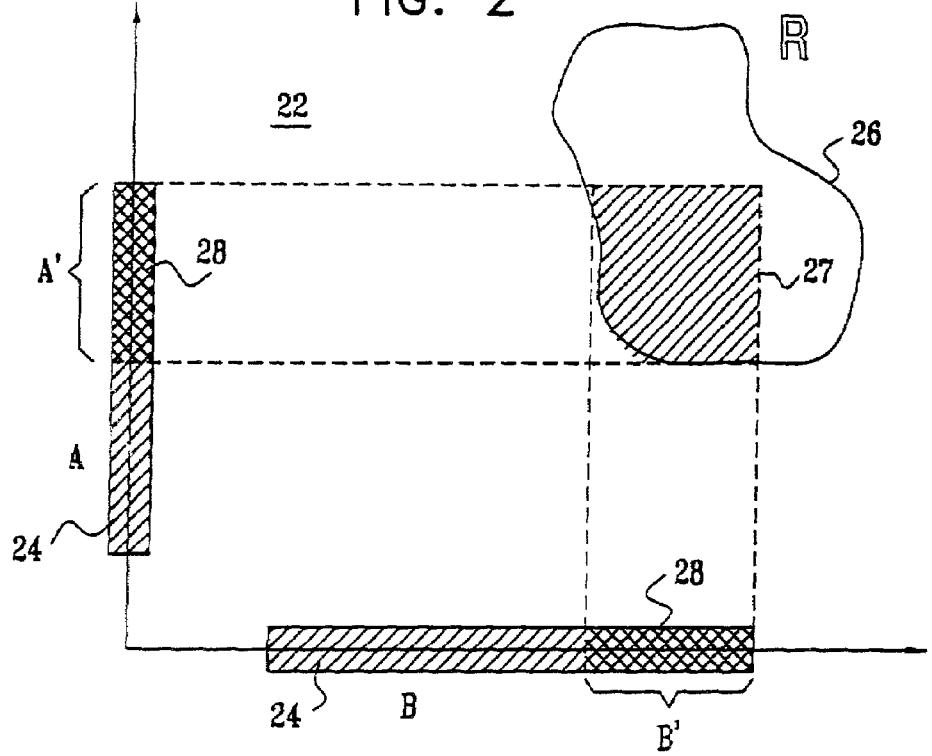
FIG. 2 is a graphic illustration showing projection of a relation onto the domains of its input variables.

FIG. 2 is a plot that schematically illustrates projection of a binary constraint, characterized by two input variables, a and b, defining a Cartesian variable space (a×b) 22. The variables are related by a relation R, which is satisfied by the variables in a solution region 26 in space 22. Each of the variables, however, is restricted to a predefined input domain 24, labeled respectively A and B, so that valid solutions to the relation are restricted to an intersection region 27. A projection function F is defined as a function that projects region 27 back onto the input domains 24, thus generating reduced output domains 28, labeled A' and B'. Formally, F accepts as inputs a vector of n sets and a n-ary relation among the sets, and outputs a vector of n sets, wherein each component of the output vector is the projection of the solution intersection region (region 27) back onto the input sets.

Preferred embodiments of the present invention seek to define projection functions F that satisfy the conditions of "solution preservation" and "solution minimization." Solution preservation means that all vectors (a,b) falling within intersection region 27 should be preserved in the Cartesian product of the output sets A' and B'. Solution minimization means that every element in a given output set can be used as a coordinate in a vector that falls within solution region 26 (and necessarily in intersection region 27). In other words, minimization implies that there are no elements in the output sets that do not belong to some valid solution of relation R.

In preferred embodiments of the present invention, a relation R that is input to system 20 is described by a hierarchy of variables, constants and operators. The operators are defined using a language of functions, including arithmetic, logical and bitwise functions, expressed using a declarative grammar. A typical arithmetic function is +:E× E→E (wherein E is the domain on which the operator "+" operates); while a typical Boolean function is >:E×E→{true, false}; and a typical bitwise function is E→E bit_and E. The output of one operator can be used as an input variable to another operator, thus building up the hierarchy that defines R. The output of the highest operator in the hierarchy is Boolean, so that R can take its place as a relation in a constraint network. The user of system 20 can use this language of operators to define complex relations among variables, in an orderly way that is then used by the system in decomposing the constraints and projecting them to determine the output domains of the variables, as described below.

In a preferred embodiment of the present invention, the grammar provided by system 20 uses the following operators, in the order of precedence listed below:
1. *, / (multiplication, division)
2. +, −
3. bit_not
4. bit_xor, bit_and, bit_or
5. =, ≠, <, >, ≦, ≧
6. ¬(logical not)
7. ∧(logical and), ∨(logical or)
8. → (logical imply)

Table I below lists grammatical rules that apply in using the operators to express constraints. Grammar variables are written in capital letters, while literal expressions are in small letters. The symbol ⇒ denotes derivation (as opposed to logical implication →). S is the first variable in the grammar, from which any valid word is derived.

TABLE I

OPERATOR GRAMMAR

| | |
|---|---|
| S ⇒ | E |
| E ⇒ | E = E |
| E ⇒ | E ≠ E |
| E ⇒ | E > E |
| E ⇒ | E < E |
| E ⇒ | (E) |
| E ⇒ | E + E |
| E ⇒ | E − E |
| E ⇒ | E * E |
| E ⇒ | concat(E,E) //concatenation of two bit-vectors |
| E ⇒ | sub_field(E,E,E) //sub-field of a bit-vector |
| E ⇒ | extend(E) //extending a bit-vector to a different width |
| E ⇒ | bit_vector_to_int(E,E) //conversion from bit-vector domain to integer domain |
| E ⇒ | mod3(E) |
| E ⇒ | E ∧ E |
| E ⇒ | E ∨ E |
| E ⇒ | ¬E |
| E ⇒ | E → E |
| E ⇒ | E bit_and E |
| E ⇒ | E bit_or E |
| E ⇒ | E bit_xor E |
| E ⇒ | bit_not(E) |
| E ⇒ | ID //variable name |
| ID ⇒ | a\|b\|c\|... //ID is used for variables - any sequence of Latin letters is valid |

The inventors have found this grammar to be useful and sufficiently complete for defining substantially any constraint network of interest in the field of automatic test generation. Variations on this grammar, as well as alternative grammars for use in other applications, will be apparent to those skilled in the art.

Figure 3:
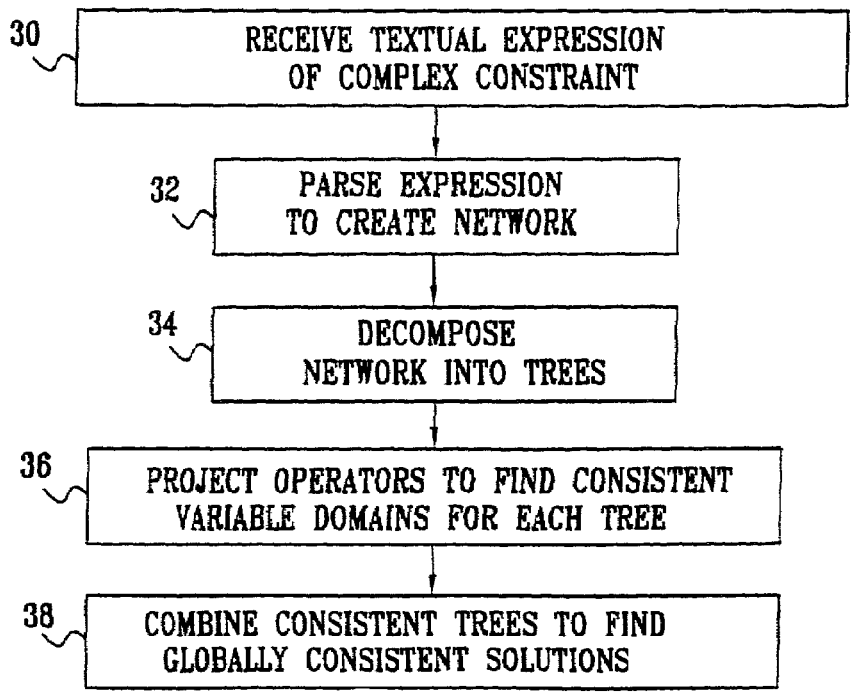
FIG. 3 is a flow chart that schematically illustrates a method for attaining arc consistency on an arc in a complex constraint network, in accordance with a preferred embodiment of the present invention.

FIG. 3 is a flow chart that schematically illustrates a method for projecting a single n-ary constraint, given in the grammar described above, in accordance with a preferred embodiment of he present invention. System 20 typically applies this method to multiple constraints in a constraint satisfaction problem. The constraints correspond to hyper-arcs, which are labeled with one of the operators of the language and have nodes representing the domains of the relevant variables. The objective of the system is to find a solution to the constraint satisfaction problem by achieving global consistency over all of the hyper-arcs, based on reducing the domains of the nodes.

The method of FIG. 3 begins with input of a complex constraint as part of a constraint network for solution by system 20, at a constraint input step 30. The network comprises a set of relations, which typically comprise complex constraints, and are preferably defined textually using the language described above. Each relation thus corresponds to an arc in the network. The language enables system 20 to parse the expression so as to create a network (graph), at a parsing step 32. The nodes of the graph are operators, variables and intermediate variables, as described below. Alternatively, even when the constraints are input to system 20 using a different grammar, the constraints can be parsed into an appropriate form. In order to reach hyper-arc consistency, the network created at step 32 is decomposed into a set of trees, at a tree generation step 34. When consistency is achieved over all of these trees, the corresponding hyper-arc will be consistent, as well.

Figure 4:
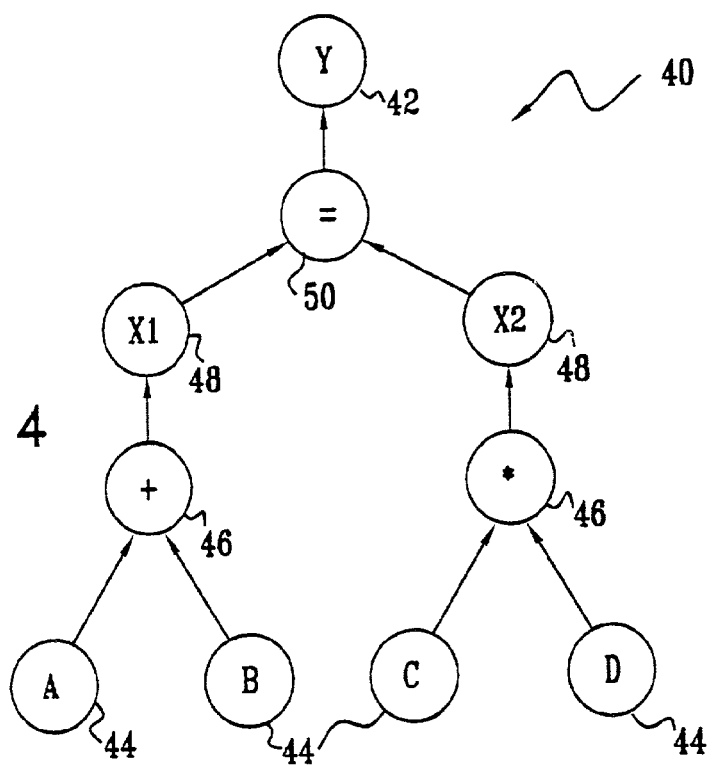
FIGS. 4 and 5 are graphic representations of exemplary relations in a constraint network, in accordance with a preferred embodiment of the present invention.

FIG. 4 is a graph showing an exemplary tree 40 generated in step 34, in accordance with a preferred embodiment of the present invention. The vertices of the tree correspond to the variables, constants and operators used in generating the output y, at an output vertex 42 of the tree, which is the Boolean result of the relation a+b=c*d. This relation is referred to herein as a "simply-supported relation," since each of the variables concerned appears only once. Tree 40 has leaves 44, which are vertices corresponding to the input variables (or constants), a, b, c and d, each with its respective domain A, B, C and D. The leaves are connected by operator vertices 46, corresponding to the arithmetic operators + and *, which have output vertices 48 that are respectively labeled x1 and x2. An upper vertex 50 generates the logical output at vertex 42.

Figure 5:
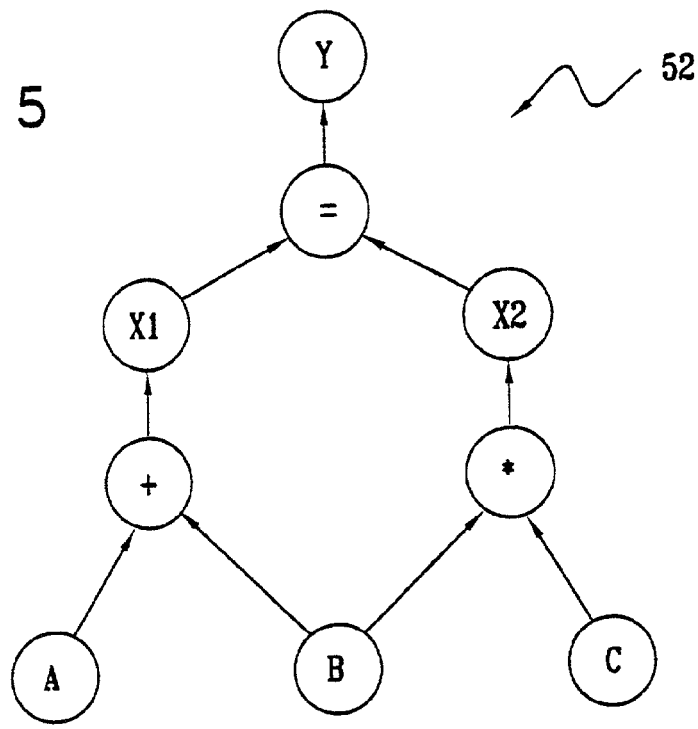

FIG. 5 is another exemplary graph 52, representing a relation that is not simply supported, in accordance with a preferred embodiment of the present invention. In this case, the relation is a+b=b*c, and it will be observed that graph 52 is not a tree. Only simply-supported relations can be represented as trees. For non-simply-supported relations (referred to herein as "complex-supported relations"), further steps or constraints are typically needed in order to achieve consistency over the entire graph. For this purpose, additional information about the variables and operators in graph 52 is preferably used to convert the graph into a tree.

Returning now to FIG. 3, after the complex constraint has been transformed into a tree, the operators are projected onto the respective variables, at a projection step 36, in order to find consistent domains for all of the variables. As noted above, finding these consistent variable domains is equivalent to achieving consistency over the entire hyper-arc. The trees are preferably stored in a memory of system 20, and can then be reused multiple times for projecting different input sets. After all of the trees have been projected, their consistent domains are combined to find globally-consistent solutions to the original complex arc, at a combination step 38. Such a solution has the form of a set of reduced domains of the variables of the arc that satisfy the solution preservation and minimization requirements described above.

For the purpose of projecting the operators in the tree at step 36, each operator of n variables is equipped with n+1 auxiliary projection functions: an output projection function from the n input sets of the operator to its output set; and n input projection functions, one to each of the n input sets from the output set and the n−1 remaining input sets. As a simple example, for the above-mentioned operator, +:(a,b) →c (meaning that a+b=c), the projection functions are given by:

$$pf_+^A : (B, C) \mapsto \{a : b \in B, c \in C, c = a + b\} \quad (1)$$

$$pf_+^B : (A, C) \mapsto \{b : a \in A, c \in C, c = a + b\}$$

$$pf_+^C : (A, B) \mapsto \{c : a \in A, b \in B, c = a + b\}$$

The + operator represented by the above equation is defined herein as an "atomic operator," in the sense that it has the form $y=op:(a_1, a_2, \ldots, a_n)$, wherein all of the $a_1$ are distinct variables or constants. In other words, an atomic relation is a simply-supported relation that can be represented by a tree that is a star graph. For atomic operators, consistent domains Y', $A'_1$, $A'_2$, . . . , $A'_n$, for all of the variables are found using the auxiliary projection functions in an algorithm defined by assignments (2) below:

$$Y' \leftarrow Y \cap pf^{Y(A}_1, A_2, \ldots A_n)$$

$$A'_1 \leftarrow A_1 \cap pf^{41}(A_2, A_3, \ldots, A_n, Y)$$

$$A'_2 \leftarrow A_2 \cap pf^{42}(A_1, A_3, \ldots, A_n, Y)$$

$$\ldots$$

$$A'_n \leftarrow A_n \cap pf^{4n}(A_1, A_2, \ldots, A_{n-1}, Y) \quad (2)$$

It can be shown that the reduced domains projected using this algorithm meet the requirements of solution preservation and solution minimization described above.

Figure 6:
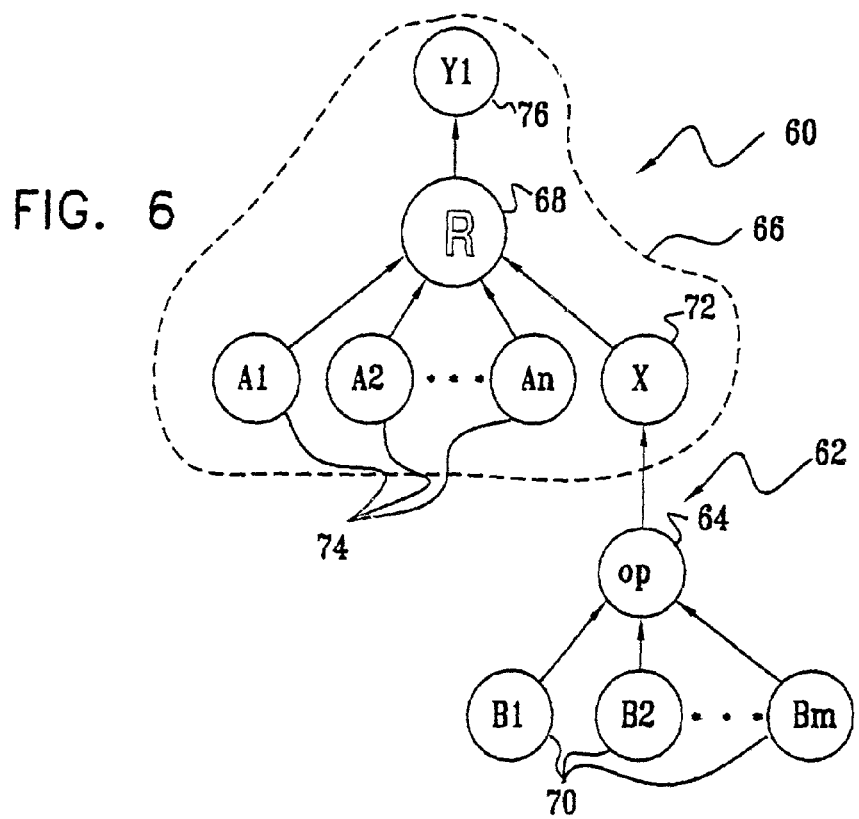
FIG. 6 is a graphic representation of a decomposition of a complex relation in a constraint network, in accordance with a preferred embodiment of the present invention.
Figure 7:
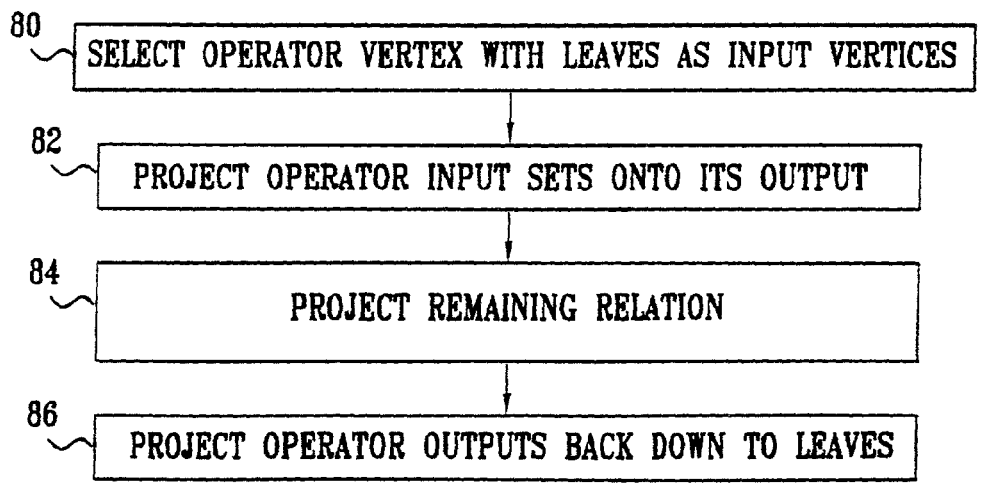
FIG. 7 is a flow chart that schematically illustrates a method for determining the domains of variables in a tree structure representing a hyper-arc in a complex constraint network, in accordance with a preferred embodiment of the present invention.

FIGS. 6 and 7 illustrate a recursive method for projecting simply-supported non-atomic relations, in accordance with a preferred embodiment of the present invention. This method is preferably used at step 36 in the general method of FIG. 3. FIG. 6 is a graph showing a tree 60 that represents an arbitrary simply-supported, non-atomic relation. Tree 60 has been decomposed to isolate a sub-tree 62, corresponding to an atomic relation based on an operator vertex 64, from a remaining portion 66 of the tree. The remainder is schematically illustrated here, for the sake of simplicity, as corresponding to a relation 68. More generally, however, the tree may contain an entire hierarchy of sub-trees, and the recursive method described hereinbelow is applied to all of them.

Operator vertex 64 has input variables (or constants) $b_1$, $b_2$, . . . , $b_m$, with corresponding domains $B_1$, $B_2$, . . . , $B_m$ and input vertices 70, which are leaves on tree 60. A vertex 72, labeled X, corresponds to the output domain of operator vertex 64. This output domain is one of the input domains of relation vertex 68, along with the domains of other vertices 74, identified as $A_1, A_2, \ldots, A_n$. The output domain of relation 68, identified as $Y_1$, is represented by a vertex 76 of tree 60.

An example of a relation of the type illustrated by FIG. 6 is $R=\{(a,b,c,d):a=b+c*d\}$. This relation is equivalent to the conjunction of the two relations $R_1=\{(a,b,x):a=b+x\}$ and $R_2=\{(x,c,d):x=c*d\}$. The input domains of a, b, c and d are respectively given as A, B, C and D, while the input domain of x is X, which is initiated to the universal set U of the output type of the operator "*". In this case, vertices 70 correspond to C and D, vertex 64 to *, vertex 74 to A and B, vertex 68 to the relation "A+B=X," and vertex 76 to the Boolean output of the entire relation, or predicate.

FIG. 7 is a flow chart that schematically illustrates a recursive method of domain projection, based on the decomposition of tree 60 shown in FIG. 6. The method begins at a vertex selection step 80, with selection of an operator vertex on the tree, such as vertex 64, whose input vertices 70 are leaves on the tree. The input sets, or domains, $B_1, B_2, \ldots, B_m$, of vertices 70 are projected onto output vertex 72 of the operator, at an input projection step 82. This step uses the appropriate auxiliary projection functions determined for the operator, as described above. The result of this step is a new, possibly reduced domain X of output vertex 72.

Step 82 is repeated recursively up the tree to vertex 76, at a recursion step 84. The remaining part of the relation is projected, potentially reducing the operator's output. In the simple example shown in FIG. 6, the newly-generated domain of vertex 72, along with the input domains of vertices 74, is projected using the same method in a recursive fashion up the tree onto the output domain of vertex 76. The different branches of the tree are typically processed sequentially, but they may also be processed in parallel as long as the input for every operator is "ready" before it is used.

After reaching vertex 76, the auxiliary projection functions are invoked in the reverse direction, down the tree, at an output projection step 86. Thus, the newly-determined domain $Y'_1$ of vertex 76 would be projected, along with domains $A'_1, \ldots, A'_n$, using the projection functions of vertex 68, to find a new, projected domain X' of vertex 72. The domain of vertex 72 is then projected back to leaves 70 using the auxiliary projection functions of the operator of vertex 64, in order to find the final values of input domains $B'_1, \ldots, B'_m$. This method is efficient, in that it actuates each of the auxiliary projection functions in the tree no more than once. Preferably, when a projection is performed repeatedly with similar inputs, operators whose input sets were not modified by the protection are identified in order to avoid actuating their auxiliary functions unnecessarily, thus enhancing the efficiency of the method still further. The method can also be shown, like the atomic operator projection algorithm described above, to generate projections that meet the criteria of solution preservation and minimization.

When a given relation in the hyper-arc is not simply-supported, however, as in the example of graph 52 shown FIG. 5, the method of FIG. 7 will not necessarily give a minimal solution fox the variable domains. Nevertheless, it is possible in some important cases to transform complex graphs, such as graph 52, into trees that will then give minimal solutions. For example, if any variables that are common to more than one relation in the graph (such as vertex B in graph 52) have a singleton input set, the method of FIG. 7 will still give a minimal solution. Similarly, if any of the intermediate sets (such as X1 or X2 in graph 52) is found to reduce to a singleton after projection from the variables in a lower tier of the graph, the solution will also be minimal.

FIGS. 8A through 8D are graphs that schematically exemplify a method for decomposing a complex relation into a tree, in accordance with a preferred embodiment of the present invention. This method is applicable, at steps 34 and 36 in the method of FIG. 3, in cases in which the relation is such that an intermediate set becomes singleton independent of the input sets. The graph in FIG. 8A symbolizes the relation $R=\{(a,b,b,c): (a=b)\wedge(b=c)\}$. To construct the graph, R is restated as $\{(x,b,c):(b=c)\wedge x\}$, wherein x is a Boolean variable with intermediate set $X_1$. If R is to have a non-trivial projection, then the intermediate set $X_1$ must be the singleton {true}, represented in FIG. 8B by {t}.

Figures 8A, 8B, 8C, 8D:
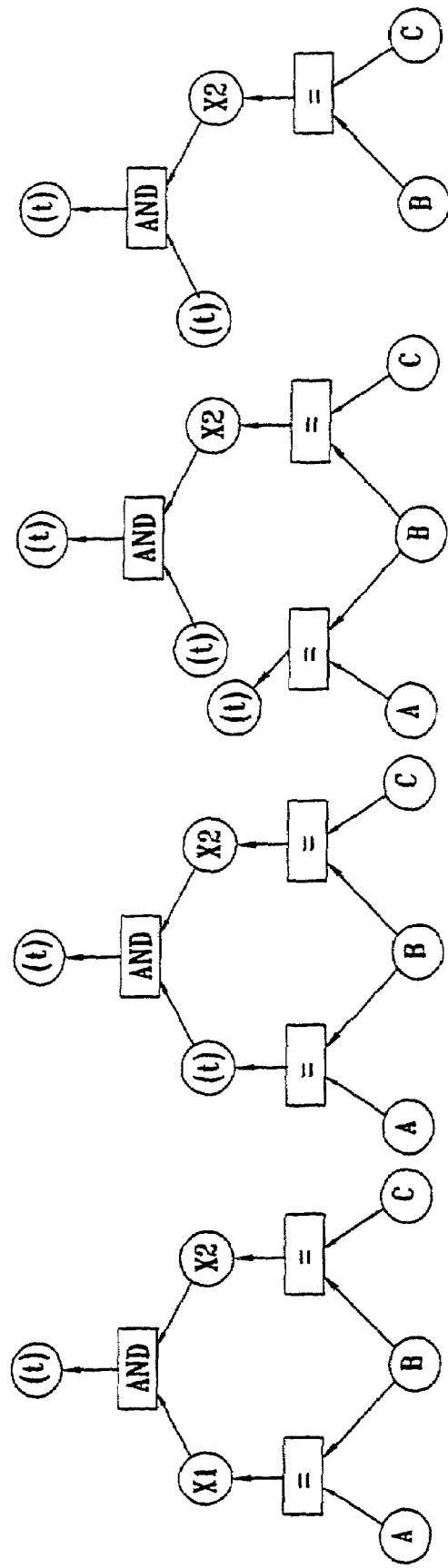
FIGS. 8A through 8D are graphic representations of a complex relation in a constraint network, illustrating stages in a method for decomposition of the relation, in accordance with a preferred embodiment of the present invention.

Because the $X_1$ vertex must have this singleton value regardless of the inputs, it can be duplicated as two separate nodes, each with the value {t}, as shown in FIG. 8C, without affecting the other domains in the graph. It is now possible to reorder the graph in the form of a tree, as shown in FIG. 8D. Now, b serves as an intermediate variable for implementing the method of FIG. 7 on this restructured tree. First, the "=" operator is projected onto domain B of b, using A and "true" as inputs. The reduced domain B after this step will be $B^* \leftarrow A \cap B$. $B^*$ and C are then projected onto the next intermediate variable $X_2$. Projection of this variable, in turn, on the "and" ($\wedge$) operator reduces its domain $X_2'$ to {t}. Projecting $X_2'$ back down the tree gives the output domains A', B' and C', which all reduce to $A \cap B \cap C$ as expected.

Although for the sake of clarity, a very simple relation was used in the example of FIGS. 8A–8D, the method exemplified by these figures may be used in any case in which analysis reveals a singleton intermediate structure. In such a case, as described above, the graph of the complex relation is restructured so that the variable that is common to multiple operators is treated as an intermediate variable, despite its being in actuality an independent variable. This restructuring enables the graph to be treated as a tree, according to the method of FIG. 7, without changing the solution domains of the variables.

In some cases, even when a given relation R is complex-supported and not given to minimal solution by the method of FIG. 7, it can be broken into a disjunction of sub-relations of the form $R=R_1 \vee R_2 \vee \ldots \vee R_m$, wherein each of the sub-relations $R_j$ is minimally solvable. A simple example of such a relation is one in which one of the variables is a common input variable to two different operators in the relation and has a non-singleton, discrete input set. If the input set of the common variable can be enumerated as a reasonable number of values, for example $B=\{b_1, b_2, b_3\}$, then the relation R can be broken into three disjoint sub-relations, $R_1$, $R_2$ and $R_3$, each using a different, respective one of the input values of the variable b. Now the singleton input set solution described above can be used to find the separate projections of $R_1$, $R_2$ and $R_3$ on the other variables of R. The full projection of R is simply the union of the separate projections of the sub-relations.

This procedure can be used generally whenever R can be expressed as a disjunction of solvable sub-relations. It is not necessary that all of the sub-relations have the same support, i.e., some or all of the sub-relations may involve different subsets of the variables of R. Even if a variable $a_j$ is not in the support of a given sub-relation $R_1$, the projection of this sub-relation is extended to include an output set $A_j'$. If the output sets of the support variables of $R_1$ are empty, then $A_j'$ is also empty. Otherwise, $A_j' \leftarrow A_j$. As in the case of variable enumeration, the full projection of R is then union of the projections of all of the sub-relations.

Figure 9:
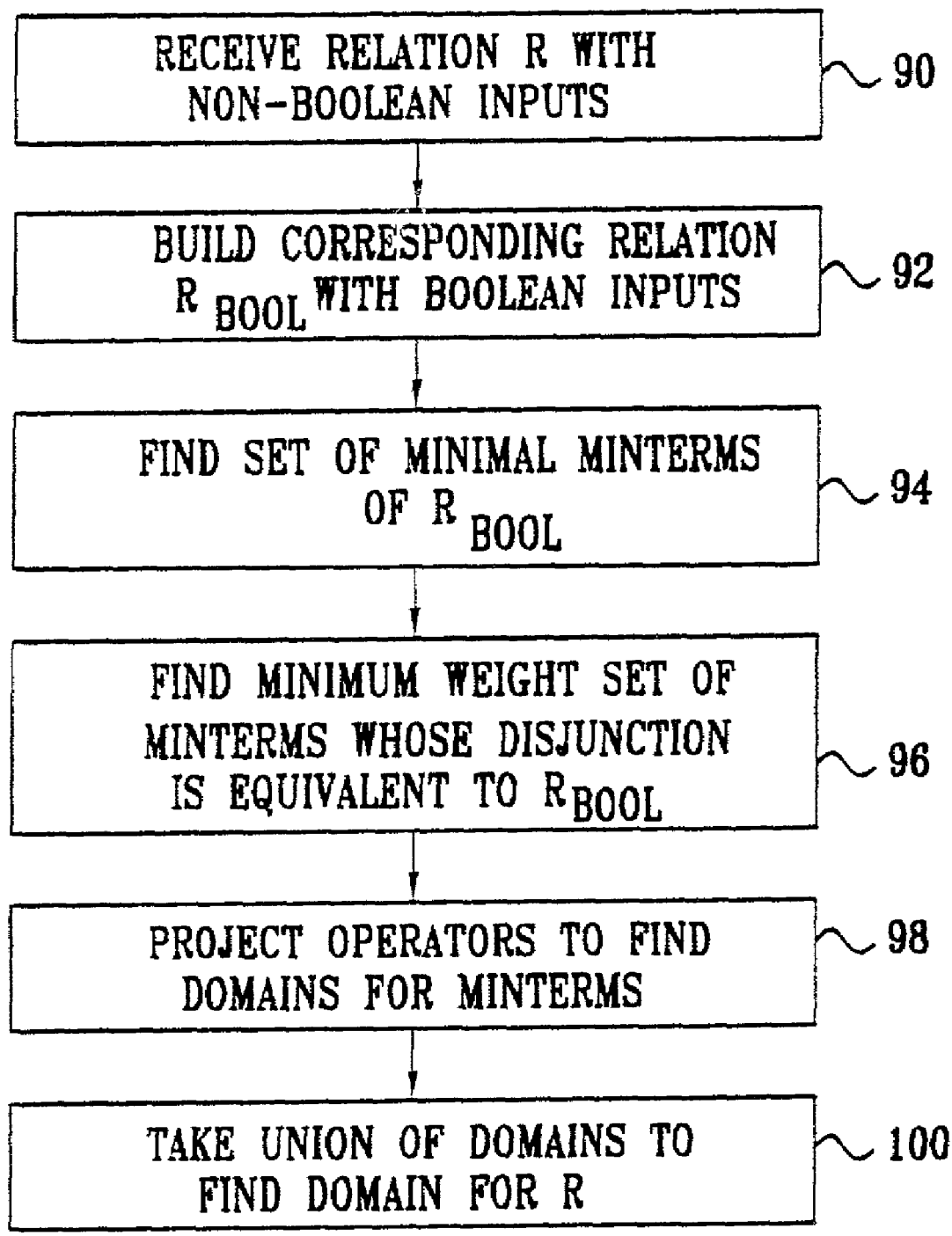
FIG. 9 is a flow chart that schematically illustrates a method for finding the projections of an arbitrary Boolean expression in a constraint network, in accordance with a preferred embodiment of the present invention.

FIG. 9 is a flow chart that schematically illustrates a general method for projecting an arbitrary expression containing logical and Boolean operations onto the domains of its variables, in accordance with a preferred embodiment of the present invention. This method enables the concepts of hyper-arc consistency, used in the method of FIG. 3, to be applied efficiently to a wide range of expressions. It is based on the property that all Boolean expressions can be converted to an equivalent disjunctive normal form (DNF). The clauses of the DNF expression, known as "minterms," are chosen so that they can be projected using the mechanisms of the present invention. Turton provides a helpful description of Boolean minimization techniques using the DNF in an article entitled "Extending Quine-McCluskey for Exclusive-Or Logic Synthesis," in *IEEE Transactions on Education* 39:1 (February, 1996), pages 81–85, which is incorporated herein by reference.

At an input step 90, system 20 receives an arbitrary Boolean relation R, made up of Boolean operators. The inputs of the operators can be either Boolean variables, outputs of other Boolean operators, or relational operators having non-Boolean inputs. A corresponding Boolean relation $R_{bool}$ is constructed, all of whose inputs are Boolean, at a construction step 92. $R_{bool}$ is generated by substituting a new Boolean variable $b_i$ for every relational operator $op_i$ in R. (For example, the relation [a=b or (c=d and e>f)] would be replaced by x1 and (x2 or x3), wherein x1, x2 and x3 stand for the relational sub-expressions they replace.) A set of all of the minimal minterms of $R_{bool}$ is found, at a minterm finding step 94, using the first phase of the Quine-McCluskey algorithm, as described in the above-mentioned article by Turton. Every minterm is a conjunction of several relation operators and Boolean variables (or their negation) from the original relation R.

A weight is determined for each of the minterms, at a weighting step 96. The weight of each minterm is the estimated cost of computing its projection, using the methods described above. A set of minterms is found whose disjunction is equivalent to $R_{bool}$, and which has the minimum cumulative weight. If there is a large number of possible minterms, an approximate algorithm can be used to minimize the weight, as is known in the art. The projection of each of the minterms in the set onto its respective variables is found, at a projection step 98, using the methods described hereinabove. $R_{bool}$, and hence R, is then projected by taking the union of all of the projected domains of the variables, at a union step 100.

In the preferred embodiments described herein, system 20 is assumed to apply the methods of the present invention to all of the constraints in a constraint network. In other embodiments, however, the system may be configured to process some of the constraints using the projection methods described above, while other constraints in the network are expressed and processed using other methods known in the art, such as methods based on explicit representation of all tuples.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computerized method for controlling operation of a target system, comprising:

receiving a set of variables that are characteristic of inputs to the target system, the variables having respective input domains, and a set of constraints comprising one or more relations defined as a combination of operators and expressed in a generic relational language, the combination comprising at least one operator selected from a group of arithmetic and bitwise operators, which are applied to the variables;

automatically parsing the constraints expressed in the generic relational language so as to build a network comprising one or more hyper-arcs, each hyper-arc corresponding to a respective relation and comprising a constraint sub-network linking nodes in the network corresponding to the variables to which the operators are applied;

processing each constraint sub-network so as to find sets of values of the variables within the input domains that satisfy the respective relation;

reducing the input domains of the variables in the network using the sets of values of the variables, so as to determine respective output domains of the variables that are consistent with the set of constraints of the network; and determining values of the inputs to be made to the target system based on the consistent output domains of the variables.

2. A method according to claim 1, wherein reducing the input domains comprises finding projections of the operators onto the domains of the variables.

3. A method according to claim 2, wherein receiving the set of variables comprises receiving an output variable for each of the operators variable and at least one input variable for each of the operators, and wherein finding the projections comprises projecting the domain of the at least one input variable of each of the operators onto the domain of the output variable thereof, and projecting the domain of the output variable of each of the operators onto the domain of the at least one input variable thereof.

4. A method according to claim 2, wherein the operators comprise multi-variable operators, which receive two or more of the variables as their inputs.

5. A method according to claim 4, wherein the multi-variable operators comprise one or more operators selected from a group consisting of arithmetic addition, arithmetic subtraction, arithmetic multiplication, arithmetic division and modulo operators.

6. A method according to claim 4, wherein the multi-variable operators comprise one or more operators selected from a group consisting of an operator testing arithmetic equality of two of the variables, an operator testing arithmetic inequality of two of the variables, and an operator testing whether one of the variables is greater than another of the variables.

7. A method according to claim 4, wherein the multi-variable operators comprise one or more operators selected from a group consisting of a bitwise "and," bitwise "or" and bitwise "exclusive or" operations.

8. A method according to claim 1, wherein the combination of operators further comprises at least one logical operator.

9. A method according to claim 8, wherein the at least one logical operator comprises at least one of a disjunction operator, a negation operator, and an implication operator.

10. A method according to claim 1, wherein processing each constraint sub-network comprises, for each of the hyper-arcs, assembling the variables in a hierarchy based on the relation corresponding to the hyper-arc, and reducing the input domains of the variables in the hierarchy.

11. A method according to claim 10, wherein assembling the variables comprises arranging the variables in a hierarchical graph, having vertices corresponding to the variables.

12. A method according to claim 11, wherein arranging the variables in the hierarchical graph comprises arranging the graph so as to have the form of one or more trees.

13. A method according to claim 12, wherein processing each constraint sub-network comprises reducing the input domains over each of the trees so as to find respective interim domains of the variables that are consistent with the relation over each of the trees, and combining the interim domains over all of the trees to determine the output domains.

14. A method according to claim 11, wherein arranging the variables in the graph comprises inserting vertices in the graph corresponding to the operators, connecting the vertices corresponding to the variables.

15. A method according to claim 1, wherein automatically parsing the constraints comprises representing the set of relations as a disjunction of multiple relations, with one of the hyper-arcs corresponding respectively to each of the relations, and
wherein reducing the input domains comprises determining interim domains of the variables for each of the hyper-arcs, and taking a union of the interim domains for each of the variables to determine the output domains.

16. A method according to claim 1, wherein processing each constraint sub-network comprises finding the sets of values of the variables within the input domains such that for any given value in the respective output domain of each of the variables, there exist values of the other variables in the respective output domains thereof that, together with the given value, constitute a solution to the set of relations.

17. A method according to claim 1, wherein processing each constraint sub-network comprises finding the sets of values of the variables within the input domains such that every set of values of the variables in the input domains that constitutes a solution to the set of relations is contained in the output domains of the variables.

18. A method according to claim 1, wherein the system comprises an electronic processor, and wherein determining the values of the inputs comprises determining commands and addresses to be input to the processor.

19. A method according to claim 1, wherein the system comprises a mechanical system, and wherein determining the values of the inputs comprises generating a command to control the system.

20. A method according to claim 1, wherein at least one of the constraints comprises a relation among at least three of the variables.

21. Apparatus for controlling operation of a target system, comprising a constraint processor, arranged to receive a set of variables that are characteristic of inputs to the target system, the variables having respective input domains, and a set of constraints comprising one or more relations defined as a combination of operators and expressed in a generic relational language, the combination comprising at least one operator selected from a group of arithmetic and bitwise operators, which are applied to the variables,
wherein the constraint processor is arranged to automatically parse the constraints expressed in the generic relational language so as to build a network comprising one or more hyper-arcs, each hyper-arc corresponding to a respective relation and comprising a constraint sub-network linking nodes in the network corresponding to the variables to which the operators are applied, to process each constraint sub-network so as to find sets of values of the variables within the input domains that satisfy the respective relation, to reduce the input domains of the variables in the network using the sets of values of the variables, so as to determine respective output domains of the variables that are consistent with the set of constraints, and to determine values of the inputs to be made to the target system based on the consistent output domains of the variables.

22. Apparatus according to claim 21, wherein the processor is arranged to reduce the input domains by finding projections of the operators onto the domains of the variables.

23. Apparatus according to claim 22, wherein the set of variables comprises an output variable and at least one input variable for each of the operators, and wherein the processor is arranged to project the domain of the at least one input variable of each of the operators onto the domain of the output variable thereof, and to project the domain of the output variable of each of the operators onto the domain of the at least one input variable thereof.

24. Apparatus according to claim 21, wherein the operators comprise multi-variable operators, which receive two of more of the variables as their inputs.

25. Apparatus according to claim 24, wherein the multi-variable operators comprise one or more operators selected from the group consisting of arithmetic addition, arithmetic subtraction, arithmetic multiplication, arithmetic division and modulo operators.

26. Apparatus according to claim 24, wherein the multi-variable operators comprise one or more operators selected from the group consisting of an operator testing arithmetic equality of two of the variables, an operator testing arithmetic inequality of two of the variables, and an operator testing whether one of the variables is greater than another of the variables.

27. Apparatus according to claim 24, wherein the multi-variable operators comprise one or more operators selected from a group consisting of a bitwise "and," bitwise "or" and bitwise "exclusive or" operations.

28. Apparatus according to claim 21, wherein the combination of operators further comprises at least one logical operator.

29. Apparatus according to claim 28, wherein the at least one logical operator comprises at least one of a disjunction operator, a negation operator, and an implication operator.

30. Apparatus according to claim 21, wherein the processor is arranged, for each of the hyper-arcs, to assemble the variables in a hierarchy based on the relation corresponding to the hyper-arc, and to reduce the input domains of the variables in the hierarchy, so as to determine the respective output domains of the variables that are consistent with the set of constraints.

31. Apparatus according to claim 30, wherein the hierarchy of the variables comprises a hierarchical graph, having vertices corresponding to the variables.

32. Apparatus according to claim 31, wherein the hierarchical graph has the form of one or more trees.

33. Apparatus according to claim 32, wherein the processor is arranged to reduce the input domains over each of the trees so as to find respective interim domains of the variables that are consistent with the relation over each of the trees, and to combine the interim domains over all of the trees to determine the output domains.

34. Apparatus according to claim 31, wherein the graph comprises vertices corresponding to the operators, connecting the vertices corresponding to the variables.

35. Apparatus according to claim 21, wherein the set of constraints is represented as a disjunction of multiple relations, with one of the hyper-arcs corresponding respectively to each of the relations, and wherein the processor is arranged to determine interim domains of the variables for each of the hyper-arcs, and to take a union of the interim domains for each of the variables to determine the output domains.

36. Apparatus according to claim 21, wherein the processor is arranged to find the sets of values of the variables within the input domains such that for any given value in the respective output domain of each of the variables, there exist values of the other variables in the respective output domains thereof that, together with the given value, constitute a solution to the set of constraints.

37. Apparatus according to claim 21, wherein the processor is arranged to find the sets of values of the variables within the input domains such that every set of values of the variables in the input domains that constitutes a solution to the set of constraints is contained in the output domains of the variables.

38. Apparatus according to claim 21, wherein the set of constraints comprises a relation that relates to at least three of the variables.

39. Apparatus according to claim 21, wherein the system comprises an electronic device, and wherein the inputs comprise commands and addresses to be input to the device.

40. Apparatus according to claim 21, wherein the system comprises a mechanical system, and wherein the inputs comprise a command to control the system.

41. A computer software product for controlling operation of a target system, the product comprising a computer-readable medium in which program instructions are stored, which instructions, when read by a computer, cause the computer, upon receiving a set of variables that are characteristic of inputs to the target system, the variables having respective input domains, and a set of constraints comprising one or more relations defined as a combination of operators and expressed in a generic relational language, the combination comprising at least one operator selected from a group of arithmetic and bitwise operators, which are applied to the variables, to automatically parse the constraints expressed in the generic relational language so as to build a network comprising one or more hyper-arcs, each hyper-arc corresponding to a respective relation and comprising a constraint sub-network linking nodes in the network corresponding to the variables to which the operators are applied, to process each constraint sub-network so as to find sets of values of the variables within the input domains that satisfy the respective relation, to reduce the input domains of the variables in the network using the sets of values of the variables, so as to determine respective output domains of the variables that are consistent with the set of constraints, and to determine values of the inputs to be made to the target system based on the consistent output domains of the variables.

* * * * *